US012755909B2

(12) United States Patent
Chen

(10) Patent No.: US 12,755,909 B2
(45) Date of Patent: Oct. 6, 2026

(54) KEYBOARD MODULE

(71) Applicant: Lite-On Technology Corporation, Taipei (TW)

(72) Inventor: Yi-Wen Chen, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 19/310,900

(22) Filed: Aug. 26, 2025

(65) Prior Publication Data

US 2026/0221355 A1 Jul. 30, 2026

Related U.S. Application Data

(60) Provisional application No. 63/748,989, filed on Jan. 24, 2025.

(30) Foreign Application Priority Data

Aug. 1, 2025 (TW) ................................ 114129277

(51) Int. Cl.
*H01H 13/02* (2006.01)
*F21V 8/00* (2006.01)

(52) U.S. Cl.
CPC ......... *H01H 13/023* (2013.01); *G02B 6/0031* (2013.01); *H01H 2219/06* (2013.01); *H01H 2219/062* (2013.01)

(58) Field of Classification Search
CPC ............ H01H 13/023; H01H 2219/06; H01H 2219/062; G02B 6/0031
See application file for complete search history.

(56) References Cited

U.S. PATENT DOCUMENTS 12,013,565 B1 * 6/2024 Pan ...................... G02B 6/0055
2024/0006134 A1 * 1/2024 Chiu ...................... H01H 13/84
2024/0118480 A1 * 4/2024 Chen .................... G02B 6/0068
2024/0201430 A1 * 6/2024 Huang .................. H01H 13/83
2024/0361509 A1 * 10/2024 Wu ...................... G02B 6/0055
2025/0093569 A1 * 3/2025 Pan ...................... G02B 6/0021
2025/0341743 A1 * 11/2025 Deng ................ G02F 1/133607
2026/0018350 A1 * 1/2026 Pan ...................... H01H 13/023

* cited by examiner

*Primary Examiner* — Christopher E Dunay
(74) *Attorney, Agent, or Firm* — JCIPRNET

(57) ABSTRACT

A keyboard module includes a base plate assembly and a key assembly. The base plate assembly includes a base plate, a light guide plate, and a plurality of light-emitting elements. The light guide plate includes a plurality of openings, and the light-emitting elements are located in the corresponding openings. The base plate includes a circuit layer and a base plate reflective layer. The light-emitting element includes a plurality of pads, the pads are connected to the circuit layer, and a part of the base plate reflective layer is located between two adjacent ones of the pads. The key assembly is connected to the base plate assembly.

12 Claims, 9 Drawing Sheets

KEYBOARD MODULE

CROSS-REFERENCE TO RELATED APPLICATION

This application claims the priority benefits of U.S. provisional application Ser. No. 63/748,989, filed on Jan. 24, 2025, and Taiwan application serial no. 114129277, filed on Aug. 1, 2025. The entirety of each of the above-mentioned patent applications is hereby incorporated by reference herein and made a part of this specification.

BACKGROUND

Technical Field

The disclosure relates to a module, and particularly relates to a keyboard module.

Related Art

Current keyboards may include multiple light-emitting elements and multiple keys, the light-emitting elements are configured to provide light to the keys, thereby enhancing the aesthetic appearance of the keyboard. Since current light-emitting elements have smaller light-emitting angles, the light-emitting elements of the keyboard need to be disposed corresponding to the keys, and the quantity of the light-emitting elements is greater than or equal to the quantity of the keys, so as to provide sufficient light sources for these keys, thereby resulting in higher costs for the keyboard.

SUMMARY

The disclosure provides a keyboard module that may reduce costs.

The keyboard module of the disclosure includes a base plate assembly and a key assembly. The base plate assembly includes a base plate, a light guide plate, and multiple light-emitting elements. The light guide plate includes multiple openings, and these light-emitting elements are located in the corresponding openings. The base plate includes a circuit layer and a base plate reflective layer. The light-emitting elements include multiple pads, the pads are connected to the circuit layer, and a part of the base plate reflective layer is located between two adjacent ones of the pads. The key assembly is connected to the base plate assembly.

Based on the above, the base plate reflective layer of the disclosure configured to reflect light emitted by the light-emitting elements, and the base plate reflective layer located between adjacent pads of the light-emitting elements may increase the reflection efficiency of light to reflect more light to the light guide plate and provide sufficient light to the key assembly. Thereby, the quantity of the light-emitting elements are reduced and the cost of the keyboard module are reduced.

DESCRIPTION OF THE EMBODIMENTS

Figure 1:
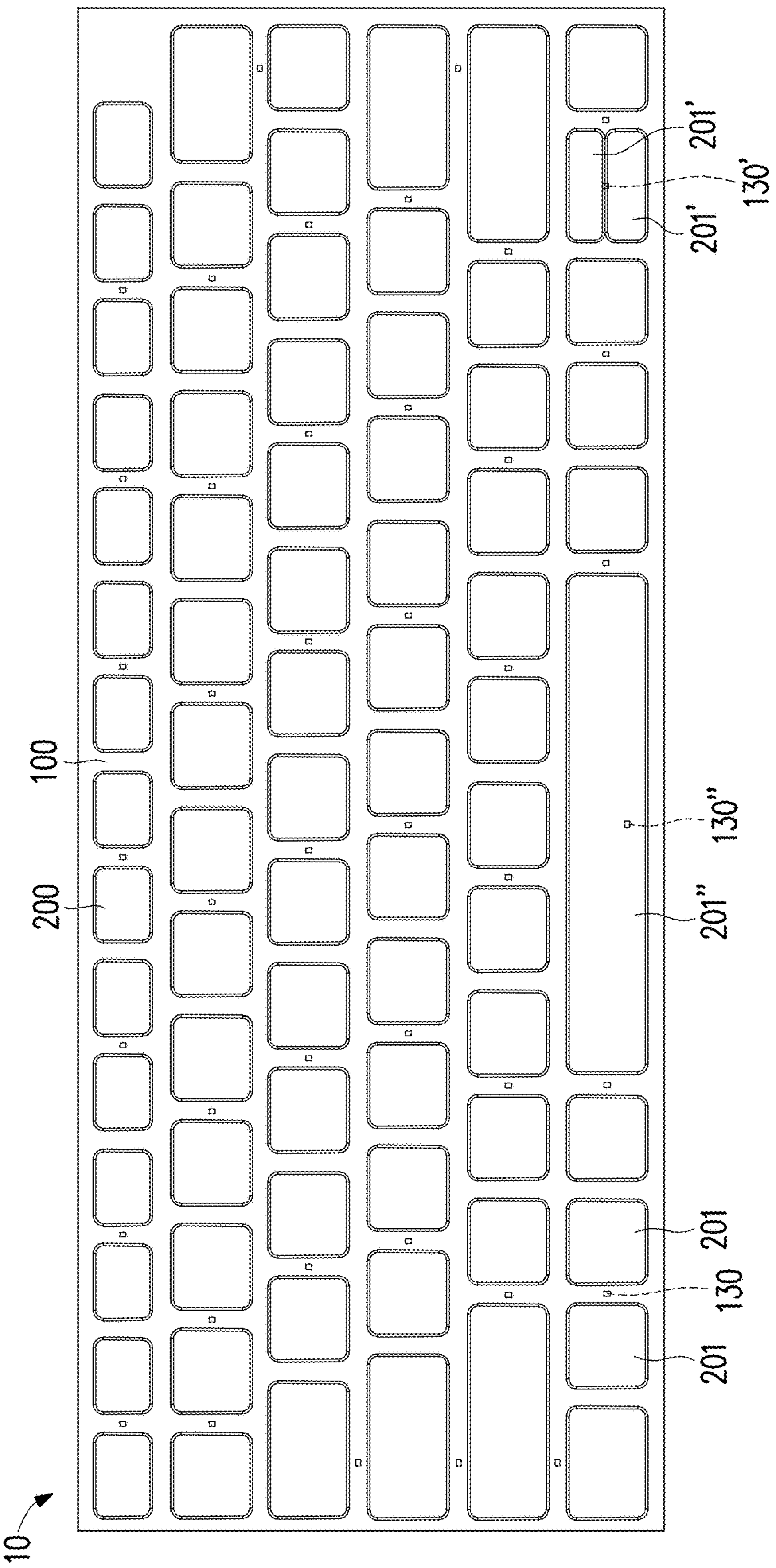
FIG. 1 is a top view of a keyboard module according to an embodiment of the disclosure.
Figure 2A:
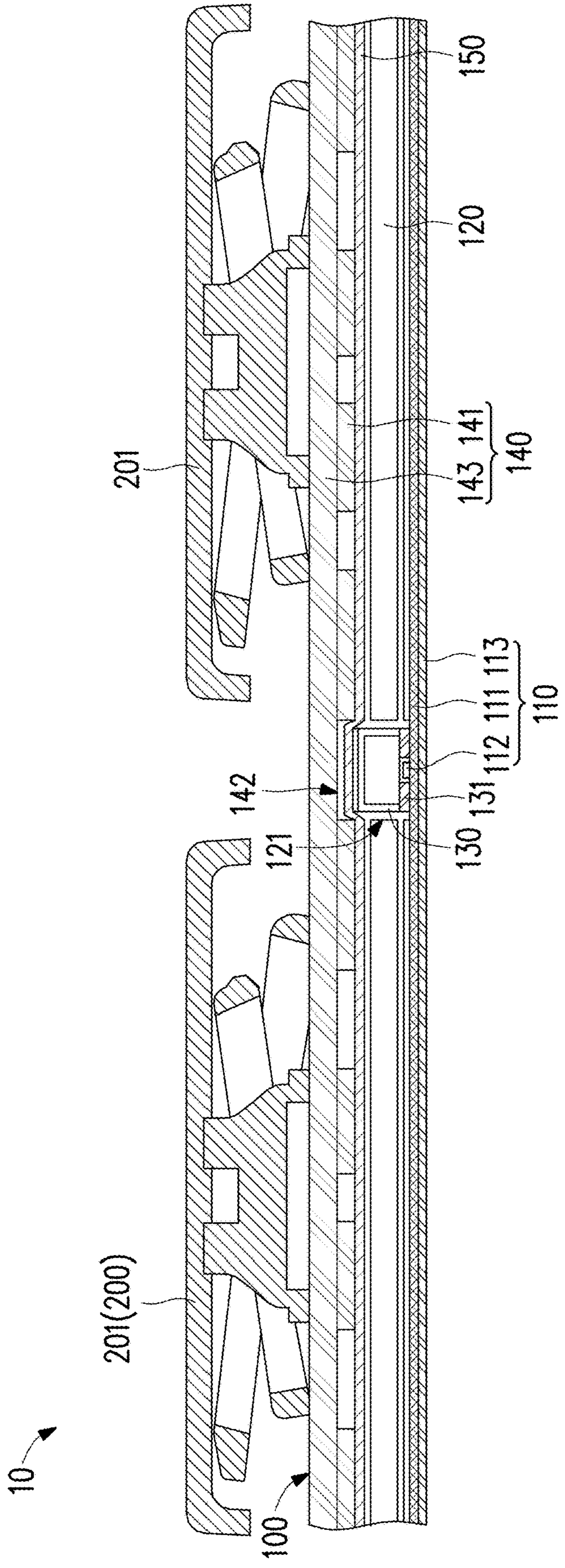
FIG. 2A is a cross-sectional view of the keyboard module in FIG. 1.
Figure 2B:
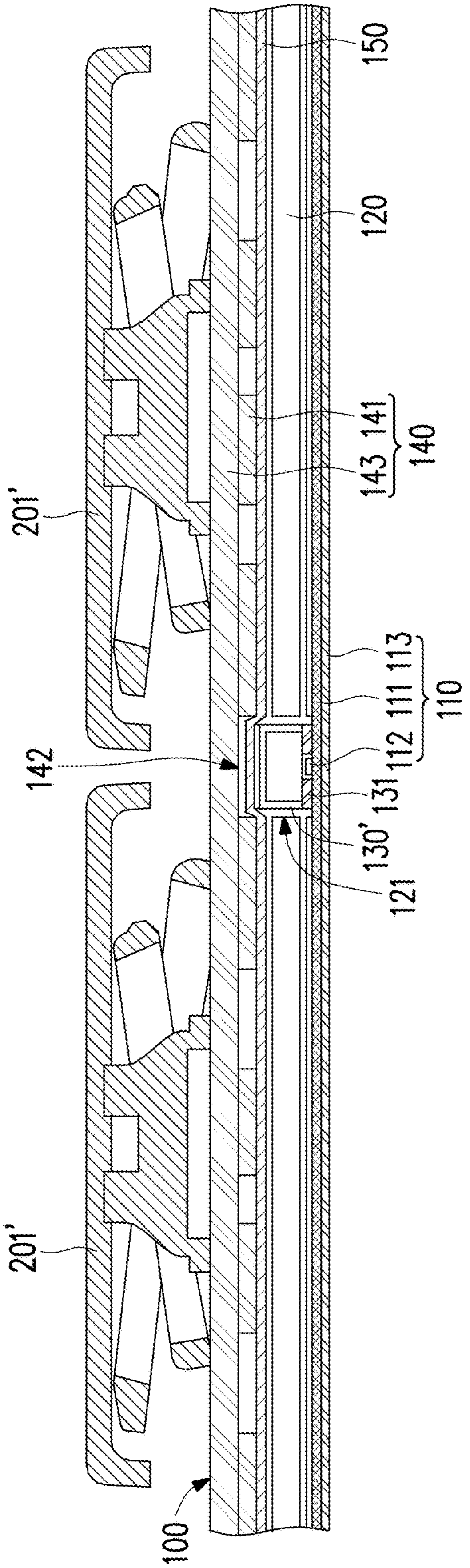
FIG. 2B is another cross-sectional view of the keyboard module in FIG. 1.
Figure 3:
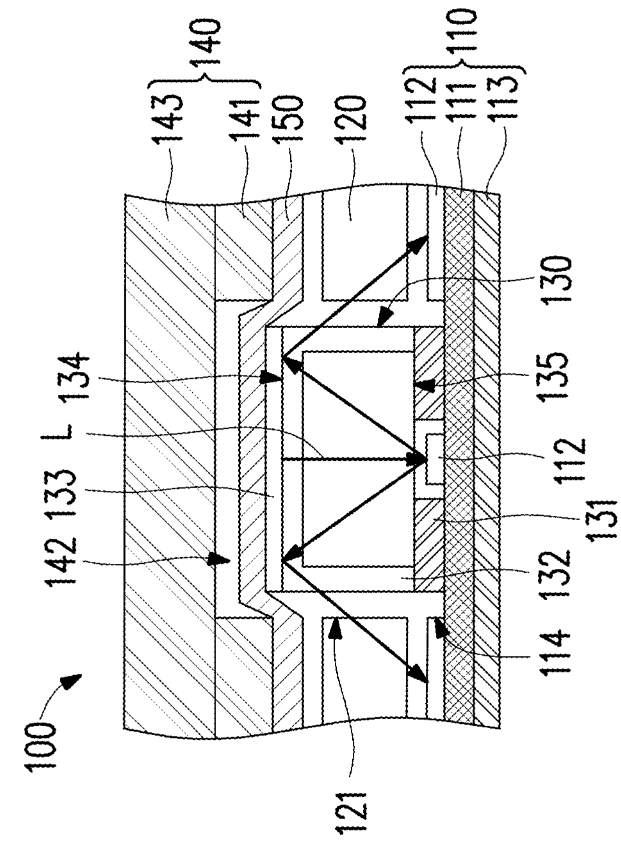
FIG. 3 is a partial enlarged view of the keyboard module in FIG. 2A.
Figure 4:
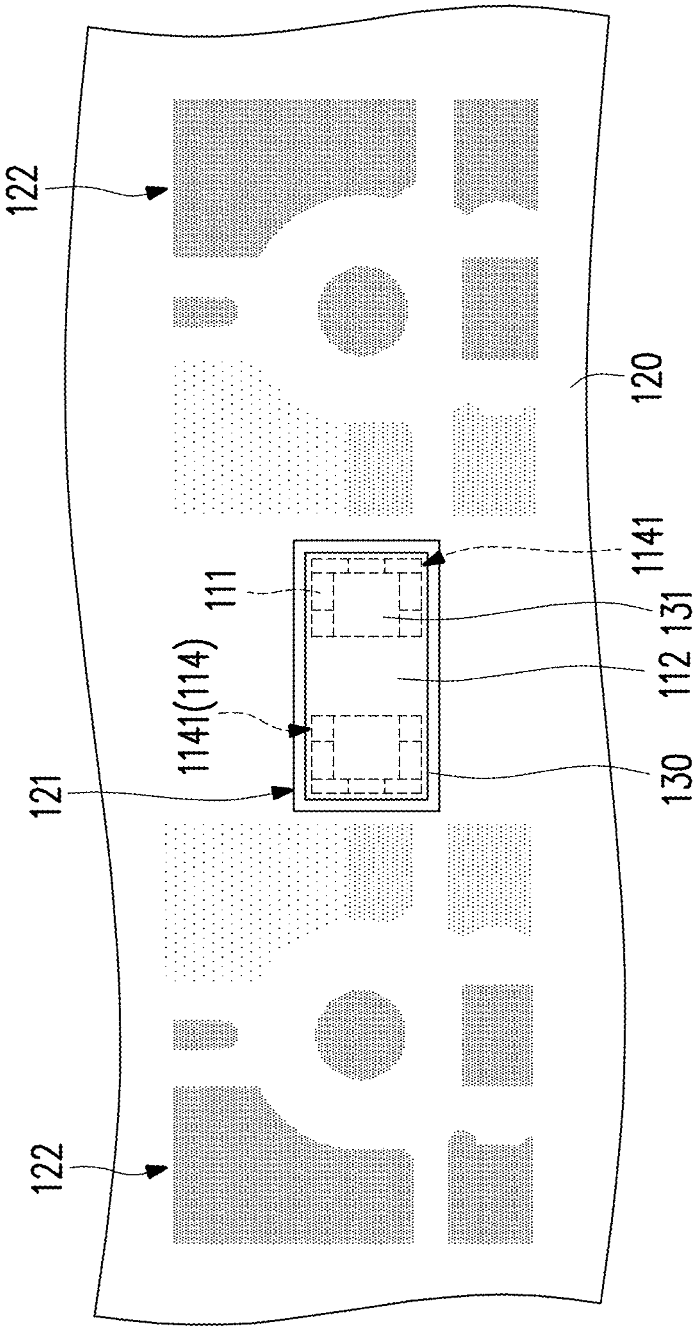
FIG. 4 is a top view of the keyboard module in FIG. 3.
Figure 5:
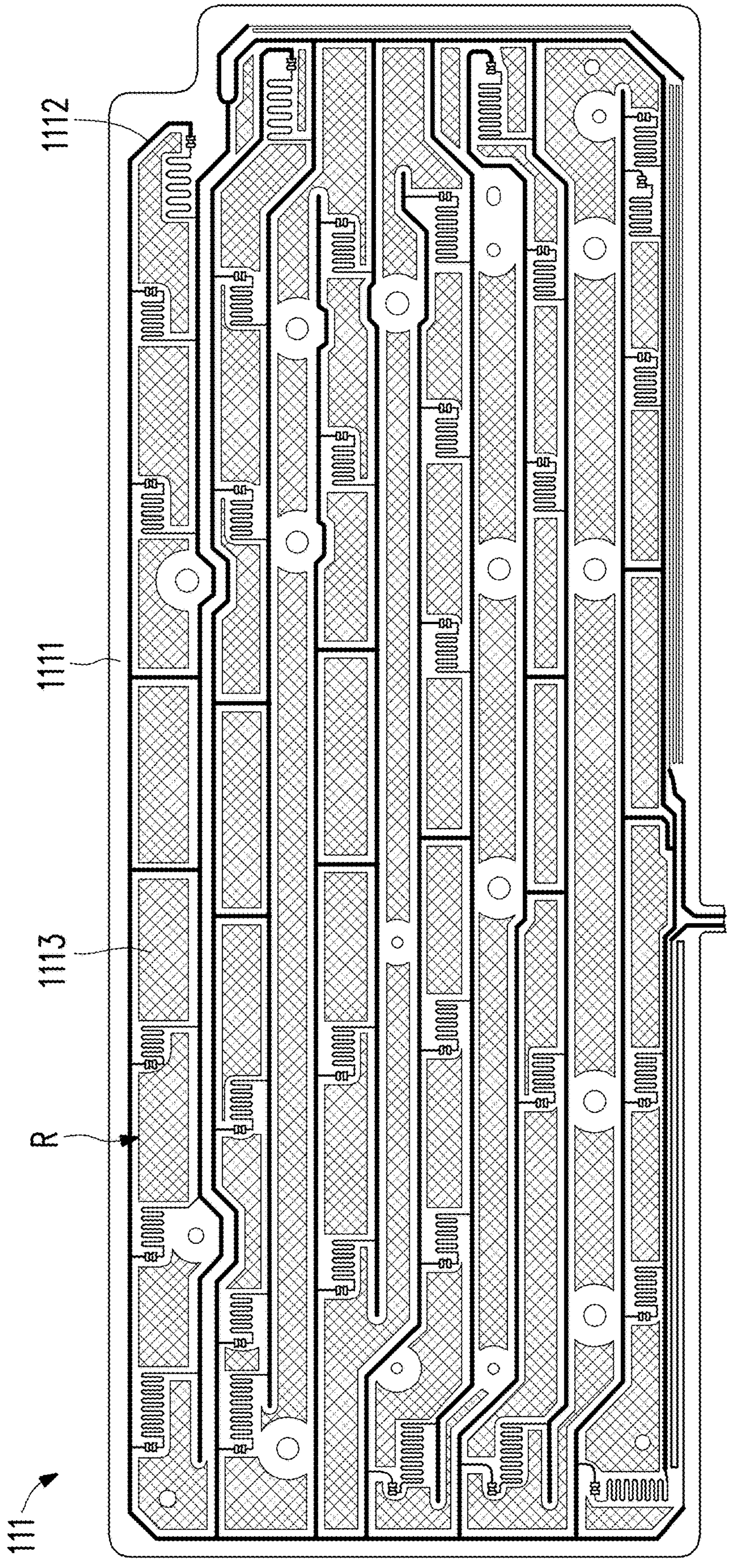
FIG. 5 is a top view of the circuit layer in FIG. 2A.

FIG. 1 is a top view of a keyboard module according to an embodiment of the disclosure. FIG. 2A is a cross-sectional view of the keyboard module in FIG. 1. FIG. 2B is another cross-sectional view of the keyboard module in FIG. 1. FIG. 3 is a partial enlarged view of the keyboard module in FIG. 2A. FIG. 4 is a top view of the keyboard module in FIG. 3. FIG. 5 is a top view of the circuit layer in FIG. 2A. Some components and structures are omitted herein, and the thickness of each component is not drawn to scale to facilitate the description of the components. Referring to FIG. 1 to FIG. 5 simultaneously, a keyboard module 10 includes a base plate assembly 100 and a key assembly 200. The base plate assembly 100 includes a base plate 110, a light guide plate 120, and a plurality of light-emitting elements 130. The light guide plate 120 includes a plurality of openings 121, and the light-emitting elements 130 are located in the corresponding openings 121. The base plate 110 includes a circuit layer 111 and a base plate reflective layer 112. The light-emitting element 130 includes a plurality of pads 131, the pads 131 are connected to the circuit layer 111, and a part of the base plate reflective layer 112 is located between two adjacent ones of the pads 131. The key assembly 200 is connected to the base plate assembly 100. The key assembly 200 includes a plurality of keys 201. The keyboard module 10 is an illuminated keyboard, and the light-emitting elements 130 are configured to provide light L to the keys 201.

Taking one light-emitting element 130 between two keys 201 in FIG. 1 as an example, FIG. 3 schematically illustrates the reflection path of the light L after the light-emitting element 130 emits the light L. The light guide plate 120 is configured to guide the light L to a specific position (for example, below two keys 201) and cause the light L to emit from the specific position. The base plate reflective layer 112 of this embodiment is configured to reflect the light L, and through the base plate reflective layer 112 located between two adjacent pads 131 of the light-emitting element 130, the reflection efficiency of the light L may be increased to reflect more light L to the light guide plate 120, thereby improving the reflection efficiency. Thereby, a single light-emitting element 130 may provide light to two or more surrounding keys 201 through the base plate reflective layer 112 and the light guide plate 120, so as to reduce the quantity of the light-emitting elements 130 disposed in the keyboard module 10, and may reduce cost.

As shown in FIG. 2A and FIG. 3, a light-emitting element 130 includes a light-emitting body 132 and an element reflective layer 133. The light-emitting body 132 includes a top surface 134 and a bottom surface 135 opposite to each other, the element reflective layer 133 is connected to the top surface 134, and the pads 131 are disposed on the bottom surface 135. The element reflective layer 133 is configured to reflect the light L emitted by the light-emitting body 132. A conventional light-emitting element without the element reflective layer 133 has a light-emitting angle of approximately 138 degrees. The light-emitting element 130 having the element reflective layer 133 of this embodiment has a light-emitting angle greater than 150 degrees, for example, 165 degrees. The quantity of the pads 131 of a single light-emitting element 130 of this embodiment is two, the element reflective layer 133 is a white housing, and the base plate reflective layer 112 includes a white ink layer. In one embodiment, the element reflective layer 133 may be a white ink layer disposed on the top surface 134 of the light-emitting body 132 through printing or other methods.

Most of the light L emitted by the light-emitting element 130 is emitted upward (that is, away from the base plate 110), and is reflected by the element reflective layer 133 and the base plate reflective layer 112, so as to propagate in the light guide plate 120 in a direction away from the light-emitting body 132. The light-emitting element 130 of this embodiment reflects most of the light L to the light guide plate 120 through the element reflective layer 133 and the base plate reflective layer 112 located between the pads 131, thereby enabling a single light-emitting element 130 to provide sufficient light L to these surrounding keys 201.

FIG. 1 to FIG. 2B show the relative positions between different keys 201, 201', 201" and light-emitting elements 130, 130', 130". The orthogonal projection of a part of the key assembly 200 of this embodiment on the base plate 110 is misaligned with the orthogonal projections of the light-emitting elements 130 on the base plate 110. Taking FIG. 2A as an example, the orthogonal projections of two keys 201 of the key assembly 200 on the base plate 110 are misaligned with the orthogonal projection of the light-emitting element 130 on the base plate 110. That is, the keys 201 are not located above the light-emitting element 130 in a normal direction of the base plate 110. The orthogonal projection of the light-emitting element 130 on the base plate 110 is located between the orthogonal projections of the two keys 201 on the base plate 110, without overlapping. The light-emitting element 130 provides light to the two keys 201. Taking FIG. 2B as an example, the orthogonal projections of other two keys 201' of the key assembly 200 on the base plate 110 partially overlap with the orthogonal projection of the light-emitting element 130' on the base plate 110. That is, part of the key 201' is located above the light-emitting element 130' in the normal direction of the base plate 110. The light-emitting element 130'provides light to the two keys 201'. As shown in FIG. 1, the orthogonal projection of the key 201" of the key assembly 200 may overlap with the orthogonal projection of the light-emitting element 130" on the base plate 110. That is, the key 201" is located above the light-emitting element 130" in the normal direction of the base plate 110, and covers the light-emitting element 130". The three light-emitting elements 130, 130', 130" may have the same structure.

In other embodiments not illustrated, the orthogonal projection of the key assembly 200 (the keys 201, 201', 201") on the base plate 110 may be misaligned with the orthogonal projections of all light-emitting elements 130, 130', 130" on the base plate 110. That is, all keys 201, 201', 201" are not located above all light-emitting elements 130, 130', 130" in the normal direction of the base plate 110. In other embodiments not illustrated, the orthogonal projection of the key assembly 200 (the keys 201, 201', 201") on the base plate 110 may partially overlap with the orthogonal projections of all light-emitting elements 130, 130', 130" on the base plate 110.

As shown in FIG. 3 and FIG. 4, the base plate 110 includes a base plate light-blocking layer 113, and the circuit layer 111 is located between the base plate reflective layer 112 and the base plate light-blocking layer 113. The base plate light-blocking layer 113 is configured to block light from the external environment. The color of the base plate light-blocking layer 113 may be black. The base plate reflective layer 112 includes a plurality of opening groups 114, and the pads 131 of the light-emitting elements 130 pass through corresponding opening groups 114 to connect to the circuit layer 111. The total area of the opening groups 114 is smaller than the area of the corresponding openings 121. One opening group 114 of this embodiment has a plurality of openings 1141, and the quantity of the openings 1141 corresponds to the quantity of the pads 131 of a single light-emitting element 130 and is two. The shape of the openings 1141 of the opening group 114 of this embodiment corresponds to the shape of the pads 131 and is rectangular, and the area of the openings 1141 is larger than the area of the corresponding pads 131. In an embodiment not illustrated, the shape of the openings 1141 may be circular or any polygon, and the area of the openings 1141 may be equal to the area of the pads 131.

As shown in FIG. 5, the circuit layer 111 includes a circuit base plate 1111, a patterned circuit 1112, and a filling layer 1113. The patterned circuit 1112 is disposed on the circuit base plate 1111 and surrounds a plurality of non-circuit areas R, and the filling layer 1113 is disposed in the non-circuit areas R. The filling layer 1113 is configured to fill the height difference between the patterned circuit 1112 and the circuit base plate 1111, so that the stress of the circuit layer 111 is more uniform and the structural strength of the circuit layer 111 is enhanced, so as to avoid deformation of the circuit layer 111 under high temperature and high humidity environments (for example, the circuit base plate 1111 produces bulging or wrinkles). The material of the patterned circuit 1112 includes but is not limited to copper and silver paste. The filling layer 1113 of this embodiment may be disposed on the circuit base plate 1111 by printing or other methods, and the filling layer 1113 is formed as a mesh, but the disclosure is not limited thereto.

As shown in FIG. 4, the light guide plate 120 has a plurality of light guide areas 122, the projections of the keys 201 (FIG. 2A) on the light guide plate 120 correspond to these light guide areas 122, and the light guide areas 122 include a plurality of openings. FIG. 4 schematically represents these openings of the light guide areas 122 with dots. A back plate 140 includes a plurality of holes (not shown) corresponding to these light guide areas 122. The light L may pass through these openings of the light guide areas 122 and these holes of the back plate 140 to emit outward, thereby causing the parts of the keyboard module 10 corresponding to these keys 201 to emit light. The openings 121 of the light guide plate 120 are located between two light guide areas 122. Since the light-emitting elements 130 have different distances from different positions in the light guide areas 122, in order to enable the light L to emit uniformly from the light guide areas 122, the opening densities at different positions of the light guide areas 122 are different. Specifically, the opening density in the light guide areas 122 adjacent to the light-emitting elements 130 is lower, and the opening density in the light guide areas 122 away from the light-emitting elements 130 is higher.

The base plate assembly 100 further includes a cover plate 150 and the back plate 140. These light-emitting elements 130 are located between the base plate 110 and the cover plate 150, and these light-emitting elements 130, the cover plate 150, and the light guide plate 120 are located between the base plate 110 and the back plate 140. The back plate 140 includes a back plate body 143 and an extension part 141 that are connected thereto, and the extension part 141 extends from the back plate body 143 toward the base plate 110. The key assembly 200 is connected to the back plate body 143 of the back plate 140. The cover plate 150 is connected with the extension part 141 of the back plate 140. The extension part 141 has a plurality of clearance holes 142, the orthogonal projections of these clearance holes 142 on the base plate 110 are aligned with the orthogonal projections of the corresponding light-emitting elements 130 on the base plate 110, and these clearance holes 142 are configured to provide clearance for the light-emitting elements 130. For example, when a thickness of the light-emitting element 130 is greater than a distance between the surface of the light guide plate 120 and the circuit layer 111, the light-emitting element 130 may protrude from the light guide plate 120 and be partially located in the clearance hole 142. Thereby, the thickness of the light-emitting element 130 may not be limited by the distance between the surface of the light guide plate 120 and the circuit layer 111.

Furthermore, FIG. 2A and FIG. 3 schematically illustrate the circuit layer 111, the base plate reflective layer 112, and the base plate light-blocking layer 113 as single layers, but the circuit layer 111, the base plate reflective layer 112, and the base plate light-blocking layer 113 may respectively be single layers or multiple layers. In other embodiments not illustrated, the base plate reflective layer 112 may include a base plate (not shown) and a white ink layer disposed on the base plate by printing or other methods, and the material of the base plate may include polyimide (PI). The base plate may be connected with the circuit layer 111 by an adhesive layer (not shown). The base plate light-blocking layer 113 may be a black polyimide (PI) layer. The total thickness of the base plate 110 may be approximately 0.085 millimeters. In other embodiments not illustrated, the base plate light-blocking layer 113 may be a black polyethylene terephthalate (PET) base plate. The total thickness of the base plate 110 may be approximately 0.097 millimeters. In other embodiments not illustrated, the base plate reflective layer 112 may be a white ink layer printed on the circuit layer 111. The base plate light-blocking layer 113 may include a base plate (not shown) and a black ink layer printed on the base plate, and the material of the base plate may include PI or PET. The total thickness of the base plate 110 may be approximately 0.097 millimeters. The circuit layer 111, the base plate reflective layer 112, and the base plate light-blocking layer 113 of the base plate 110 may be combinations of the above embodiments.

The components of the base plate assembly 100 (such as the extension part 141, the cover plate 150, the light guide plate 120, and the base plate 110) may be connected by adhesive layers. The keys 201 of the key assembly 200 may have scissor-switch structures, but the disclosure is not limited thereto. The keys 201 may have any known form of structure and be connected to the back plate 140 by any known method.

Figure 6:
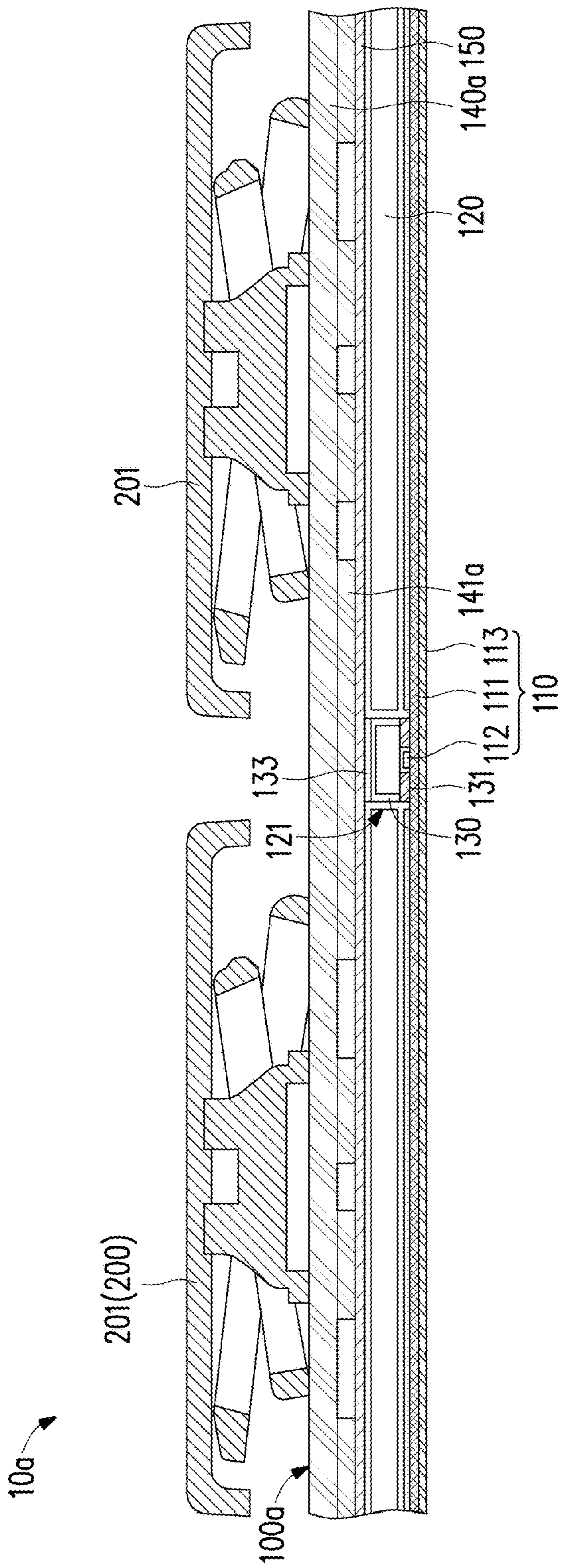
FIG. 6 is a cross-sectional view of a keyboard module according to another embodiment of the disclosure.

FIG. 6 is a cross-sectional view of a keyboard module according to another embodiment of the disclosure. Referring to FIG. 2A together with FIG. 6, a keyboard module 10*a* of this embodiment is similar to the foregoing embodiment, and the difference between the embodiments is that an extension part 141*a* of a back plate 140*a* of a base plate assembly 100*a* of this embodiment does not have openings corresponding to the light-emitting elements 130. The tops of the light-emitting elements 130 are flush with the surface of the light guide plate 120. The keyboard module 10*a* of this embodiment has similar effects with the foregoing embodiment, so details will not be repeated here.

Figure 7:
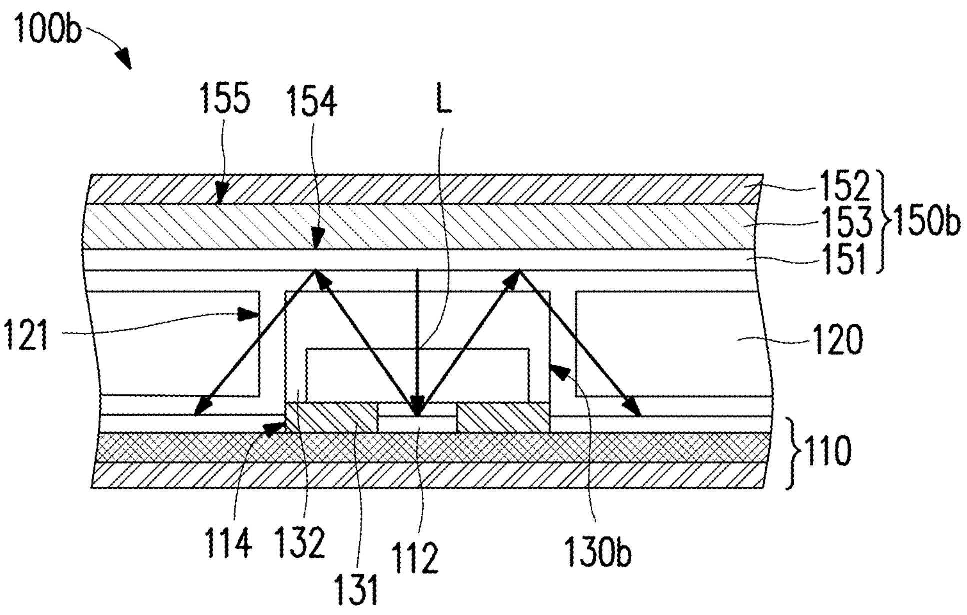
FIG. 7 is a cross-sectional view of a base plate assembly according to another embodiment of the disclosure.

FIG. 7 is a cross-sectional view of a base plate assembly according to another embodiment of the disclosure, with some components omitted herein (for example, the back plate 140 in FIG. 2A). Referring to FIG. 3 together with FIG. 6, a base plate assembly 100*b* of this embodiment is similar to the foregoing embodiment, and the difference between the embodiments is that a cover plate 150*b* of this embodiment includes a cover plate reflective layer 151, a cover plate light-blocking layer 152, and a cover plate body 153. A light-emitting element 130*b* does not include an element reflective layer 133. The cover plate reflective layer 151 is located between the cover plate light-blocking layer 152 and the light guide plate 120. The light-emitting body 132 of the light-emitting element 130*b* is located between the cover plate reflective layer 151 and the base plate reflective layer 112. The cover plate reflective layer 151 is configured to reflect the light L emitted by the light-emitting element 130*b* to replace the element reflective layer 133. The light L emitted by the light-emitting element 130*b* reflects between the cover plate reflective layer 151 and the base plate reflective layer 112 and transmits to the light guide plate 120. The cover plate light-blocking layer 152 is configured to block light from the external environment.

The cover plate reflective layer 151 and the cover plate light-blocking layer 152 of this embodiment are respectively disposed on two surfaces 154, 155 of the cover plate body 153. The cover plate reflective layer 151 is located between the cover plate light-blocking layer 152 and the base plate reflective layer 112. The cover plate body 153 is a light-transmissive film. The cover plate reflective layer 151 and the cover plate light-blocking layer 152 have corresponding openings in parts corresponding to the light guide area 122 (FIG. 4) to allow the light L to penetrate the cover plate 150*b*. The cover plate reflective layer 151 of this embodiment is a white ink layer printed on the surface 154 facing the light-emitting element 130*b*, and the cover plate light-blocking layer 152 is a black ink layer printed on the surface 155 facing away from the light-emitting element 130*b*. The base plate assembly 100*b* of this embodiment has similar effects with the foregoing embodiment, so details will not be repeated here.

Figure 8:
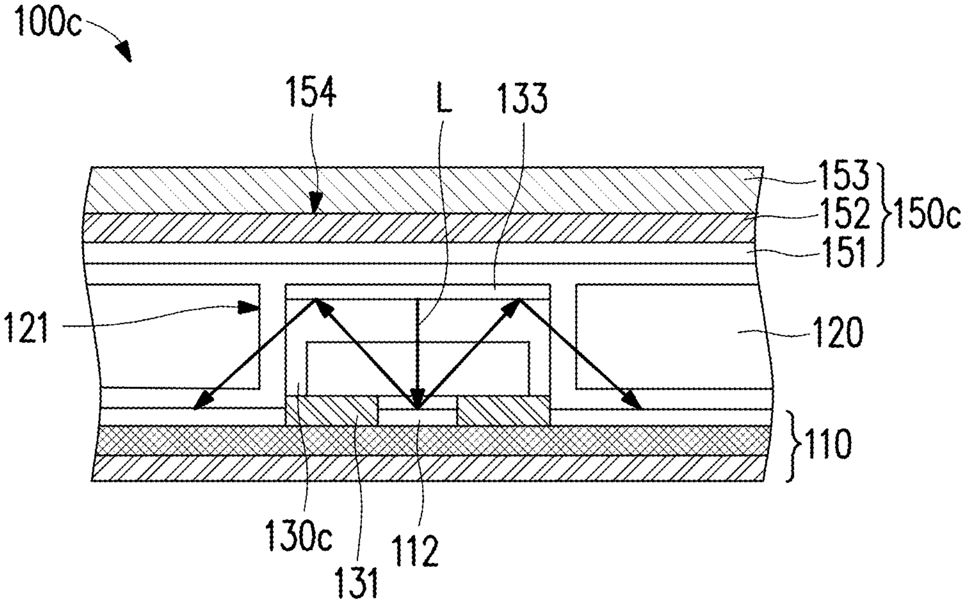
FIG. 8 is a cross-sectional view of a base plate assembly according to another embodiment of the disclosure.

FIG. 8 is a cross-sectional view of a base plate assembly according to another embodiment of the disclosure, with some components omitted herein. Referring to FIG. 7 together with FIG. 8, a base plate assembly 100*c* of this embodiment is similar to the foregoing embodiment, and the difference between the embodiments is that the cover plate light-blocking layer 152 of this embodiment is disposed on the surface 154 of the cover plate body 153 facing the base plate 110, and the cover plate reflective layer 151 is disposed on the cover plate light-blocking layer 152. The light-emitting element 130*c* includes an element reflective layer 133. The cover plate reflective layer 151 is configured to assist the element reflective layer 133 to reflect the light L emitted by the light-emitting element 130*c*. The base plate assembly 100*c* of this embodiment has similar effects with the foregoing embodiment, so details will not be repeated here.

Figure 9:
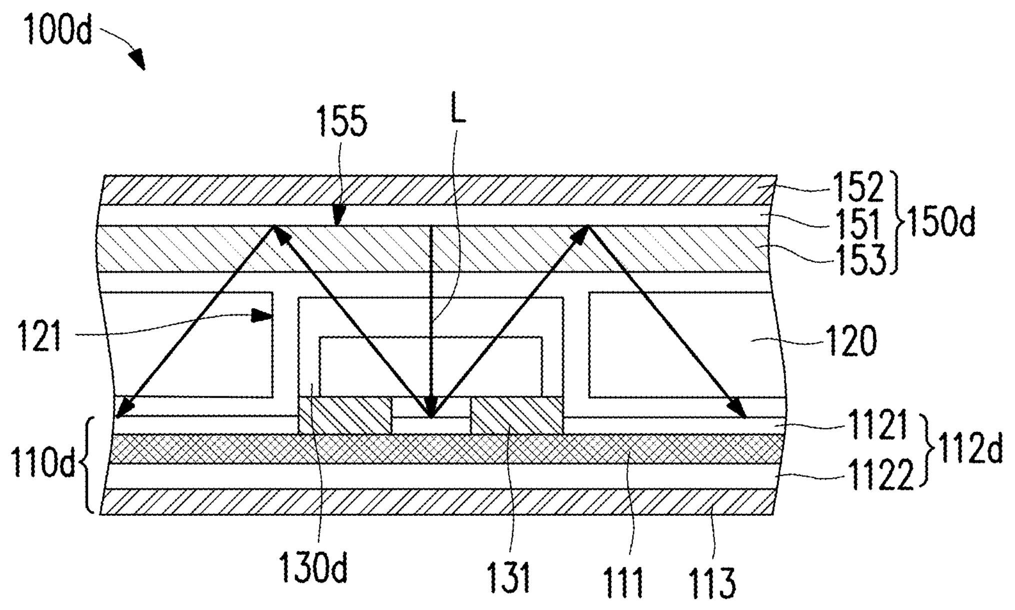
FIG. 9 is a cross-sectional view of a base plate assembly according to another embodiment of the disclosure.

FIG. 9 is a cross-sectional view of a base plate assembly according to another embodiment of the disclosure, with some components omitted herein. Referring to FIG. 7 together with FIG. 9, a base plate assembly 100*d* of this embodiment is similar to the foregoing embodiment, and the difference between the embodiments is that the cover plate reflective layer 151 of this embodiment is disposed on the surface 155 of the cover plate body 153 facing away from the base plate 110, and the cover plate light-blocking layer 152 is disposed on the cover plate reflective layer 151. The base plate reflective layer 112*d* includes a first reflective layer 1121 and a second reflective layer 1122. The first reflective layer 1121 is disposed on the circuit layer 111, and a part of the first reflective layer 1121 is located between two adjacent ones of the pads 131 of the light-emitting element 130. The circuit layer 111 is located between the first reflective layer 1121 and the second reflective layer 1122.

The base plate light-blocking layer 113 of this embodiment is a black PET base plate, and the second reflective layer 1122 is a white ink layer disposed on one surface of the black PET base plate facing the first reflective layer 1121. The first reflective layer 1121 includes a PI base plate and a white ink layer disposed on the PI base plate. The total thickness of the base plate 110*d* may be approximately 0.107 millimeters. In other embodiments not illustrated, the second reflective layer 1122 may be a white PET base plate, and the base plate light-blocking layer 113 may be a black ink layer disposed on one surface of the white PET base plate facing away from the first reflective layer 1121. The total thickness of the base plate 110*d* may be approximately 0.107 millimeters. In other embodiments not illustrated, the second reflective layer 1122 may be a white PET base plate, and the base plate light-blocking layer 113 may be a black ink layer disposed on the white PET base plate. The first reflective layer 1121 may be a white ink layer disposed on the circuit layer 111. The total thickness of the base plate 110*d* may be approximately 0.097 millimeters. The base plate assembly 100*d* of this embodiment has similar effects with the foregoing embodiment, so details will not be repeated here.

Figure 10:
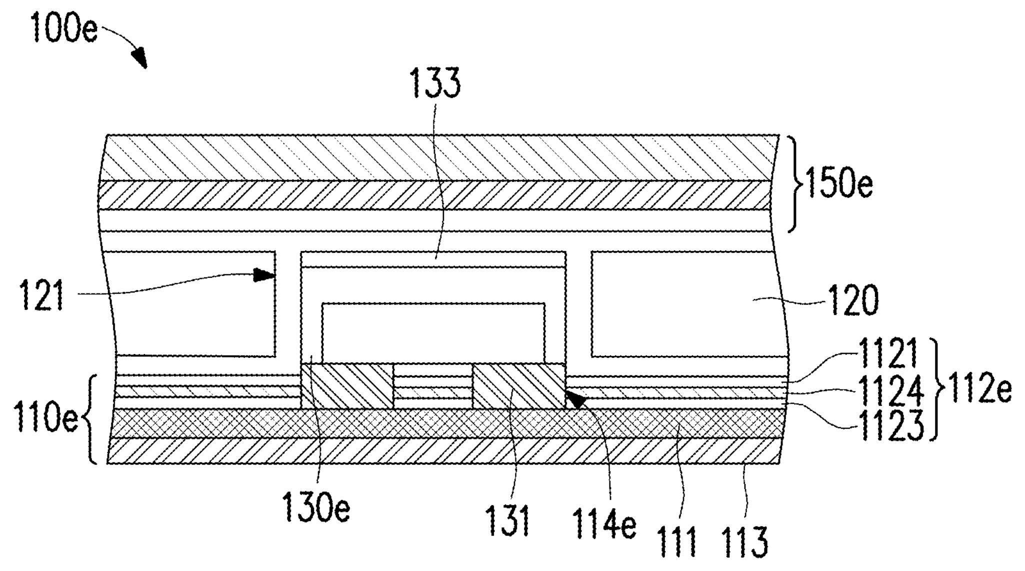
FIG. 10 is a cross-sectional view of a base plate assembly according to another embodiment of the disclosure.

FIG. 10 is a cross-sectional view of a base plate assembly according to another embodiment of the disclosure, with some components omitted herein. Referring to FIG. 8 together with FIG. 10, a base plate assembly 100*e* of this embodiment is similar to the foregoing embodiment, and the difference between the embodiments is that a base plate reflective layer 112*e* of this embodiment includes a reflective base plate 1124, a first reflective layer 1121, and a third reflective layer 1123, and the third reflective layer 1123 is located between the first reflective layer 1121 and the circuit layer 111. The first reflective layer 1121 is disposed on the circuit layer 111 and part of the first reflective layer 1121 is located between two pads 131 of the light-emitting element 130. The first reflective layer 1121 and the third reflective layer 1123 are disposed on two opposite surfaces of the reflective base plate 1124, and an opening group 114*e* penetrates through the reflective base plate 1124, the first reflective layer 1121, and the third reflective layer 1123.

In other embodiments not illustrated, the base plate reflective layer may not have the reflective base plate 1124. The third reflective layer 1123 may be a white PET base plate, and the first reflective layer 1121 may be a white ink layer disposed on the white PET base plate. The total thickness of the base plate 110*e* may be approximately 0.122 millimeters. In other embodiments not illustrated, the base plate reflective layer may further include a second reflective layer 1122 located between the circuit layer 111 and the base plate light-blocking layer 113. The base plate assembly 100*e* of this embodiment has similar effects with the foregoing embodiment, so details will not be repeated here.

In summary, the base plate reflective layer of the disclosure configured to reflect light emitted by the light-emitting elements, and the base plate reflective layer located between adjacent pads of the light-emitting elements may increase the reflection efficiency of light to reflect more light to the light guide plate and provide sufficient light to the key assembly. Thereby, the orthogonal projection of the key assembly on the base plate and the orthogonal projection of the light-emitting elements on the base plate are at least partially misaligned to reduce the quantity of the light-emitting elements and reduce the cost of the keyboard module.

What is claimed is:

1. A keyboard module, comprising:

a base plate assembly, comprising a base plate, a light guide plate, a back plate, and a plurality of light-emitting elements, wherein the light guide plate comprises a plurality of openings, the light-emitting elements are located in corresponding ones of the openings, the base plate comprises a circuit layer and a base plate reflective layer, each of the light-emitting elements comprises a plurality of pads, the pads are connected to the circuit layer, and a part of the base plate reflective layer is located between adjacent ones of the pads, the light-emitting elements are located between the base plate and the back plate, an extension part of the back plate has a plurality of clearance holes, orthogonal projections of the clearance holes on the base plate are aligned with orthogonal projections of corresponding ones of the light-emitting elements on the base plate; and a key assembly, connected to the back plate.

2. The keyboard module as claimed in claim 1, wherein each of the light-emitting elements comprises a light-emitting body and an element reflective layer, the light-emitting body comprises a top surface and a bottom surface opposite to each other, the element reflective layer is connected to the top surface, and the pads are disposed on the bottom surface.

3. The keyboard module as claimed in claim 1, wherein the base plate assembly comprises a cover plate, the cover plate comprises a cover plate reflective layer, the light-emitting elements are located between the base plate and the cover plate reflective layer, and the light-emitting elements are located between the cover plate reflective layer and the base plate reflective layer.

4. The keyboard module as claimed in claim 3, wherein the cover plate comprises a cover plate body and a cover plate light-blocking layer, the cover plate reflective layer and the cover plate light-blocking layer are respectively disposed on two opposite surfaces of the cover plate body, and the cover plate reflective layer is located between the cover plate light-blocking layer and the base plate reflective layer.

5. The keyboard module as claimed in claim 3, wherein the cover plate comprises a cover plate body and a cover plate light-blocking layer, the cover plate light-blocking layer is disposed on the cover plate body, the cover plate reflective layer is disposed on the cover plate light-blocking layer, and the cover plate reflective layer is located between the cover plate light-blocking layer and the base plate reflective layer.

6. The keyboard module as claimed in claim 3, wherein the cover plate comprises a cover plate body and a cover plate light-blocking layer, the cover plate reflective layer is disposed on the cover plate body, the cover plate light-blocking layer is disposed on the cover plate reflective layer, and the cover plate reflective layer is located between the cover plate light-blocking layer and the base plate reflective layer.

7. The keyboard module as claimed in claim 1, wherein the base plate comprises a base plate light-blocking layer, and the circuit layer is located between the base plate reflective layer and the base plate light-blocking layer.

8. The keyboard module as claimed in claim 1, wherein the base plate reflective layer comprises a first reflective layer and a second reflective layer, the first reflective layer is disposed on the circuit layer, a part of the first reflective layer is located between two adjacent ones of the pads, and the circuit layer is located between the first reflective layer and the second reflective layer.

9. The keyboard module as claimed in claim 8, wherein the base plate reflective layer comprises a third reflective layer, and the third reflective layer is located between the first reflective layer and the circuit layer.

10. The keyboard module as claimed in claim 1, wherein the base plate reflective layer comprises a plurality of opening groups, the pads of each of the light-emitting elements pass through corresponding each of the opening groups to connect to the circuit layer, and an area of each of the opening groups is smaller than an area of corresponding each of the openings.

11. The keyboard module as claimed in claim 1, wherein the circuit layer comprises a circuit base plate, a patterned circuit, and a filling layer, the patterned circuit is disposed on the circuit base plate and surrounds a plurality of non-circuit areas, and the filling layer is disposed in the non-circuit areas.

12. The keyboard module as claimed in claim 1, wherein an orthogonal projection of at least a part of the key assembly on the base plate is misaligned with orthogonal projections of the light-emitting elements on the base plate.

* * * * *